No. 777,371. PATENTED DEC. 13, 1904.
C. G. B. HOLMAN.
SPEED INDICATOR.
APPLICATION FILED JUNE 13, 1904.

NO MODEL.

Witnesses
Harry Ellis Chandlee
William C. D. Keyes

Inventor
C. G. B. Holman
by
Chandlee & Chandlee
Attys.

No. 777,371.

Patented December 13, 1904.

UNITED STATES PATENT OFFICE.

CHARLES GEORGE BRINSMEAD HOLMAN, OF NORFOLK, ENGLAND.

SPEED-INDICATOR.

SPECIFICATION forming part of Letters Patent No. 777,371, dated December 13, 1904.

Application filed June 13, 1904. Serial No. 212,371. (No model.)

*To all whom it may concern:*

Be it known that I, CHARLES GEORGE BRINSMEAD HOLMAN, a subject of the King of Great Britain and Ireland, residing at Crown street, Diss, Norfolk, England, have invented certain new and useful Improvements in Speed-Indicators, of which the following is a specification.

This invention relates to speed-indicators for cycles, automobiles, and machinery generally; and it has for its object to provide a self-contained device of this class capable of positively indicating the rate of travel or of rotation in absolute measurements without involving a time equation—that is, the device will automatically indicate at how many miles per hour, feet per second, or other rate the vehicle is moving, or it will indicate the number of revolutions in unit time of a steam-engine or the like without going through the stages of estimating the distance traveled in a given time and then calculating the rate of travel by dividing by the number of time units taken.

The invention is illustrated by the accompanying drawings, in which—

Figure 1:
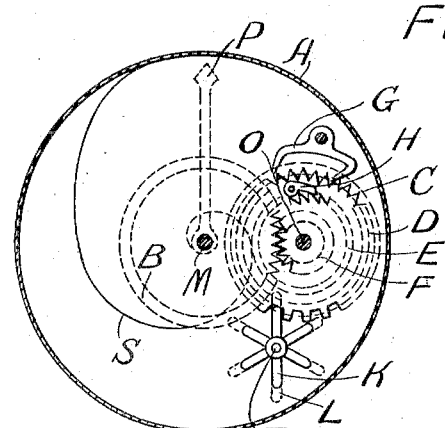
Figure 2:
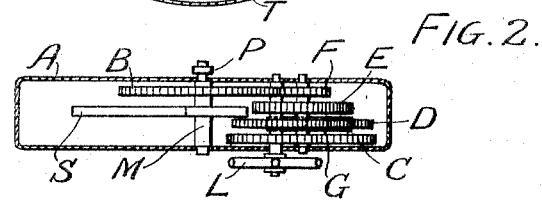
Figure 3:
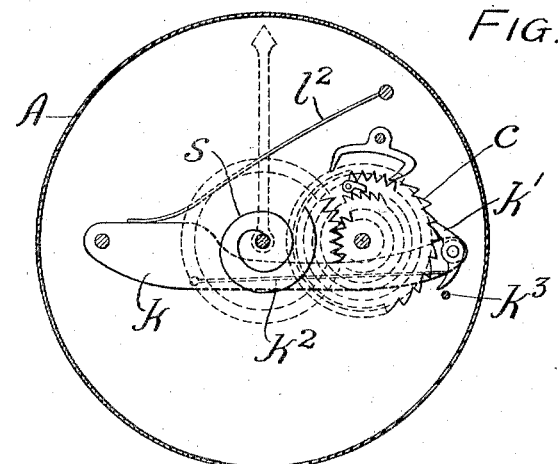
Figure 4:
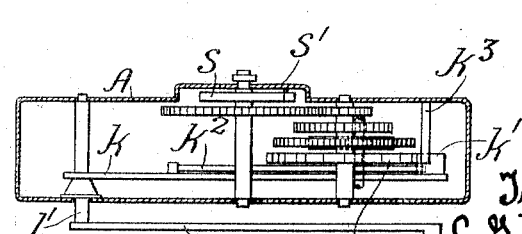

Figure 1 is a sectional plan, and Fig. 2 a sectional elevation more or less diagrammatic, illustrating one form of carrying out my invention. Figs. 3 and 4 are respectively sectional plan and sectional elevation showing a modification.

Referring to Figs. 1 and 2, the device therein shown comprises a casing A, of metal or other suitable material, of substantially cylindrical form and having a transparent face. Axially through said casing is carried a spindle M, to which is fixed one end of a coil-spring S, the other end of which spring is secured to the wall of the casing A. Secured upon the said spindle M is a cog-wheel B, with which wheel B gears a smaller wheel F, mounted on the spindle O. On the said spindle O is also mounted the wheel C and the ratchet-wheel E. A wheel D is free to move on the spindle O and is provided with an escapement attachment G. A pawl H, fitted upon the wheel D and acting on the ratchet-teeth of the wheel E, allows the wheel D to be turned in one direction by the wheel C. Through the base of the casing A is passed a spindle T, from the ends of which project arms K L, fixed perpendicularly to said spindle T and disposed at equal distances apart. The arms K within the casing A engage the wheel C, the device being placed in such a position that the arms L are moved round in succession by a projection fixed to a rotating part of the machine the speed of which is to be registered. The central spindle M has fitted to it an index-pointer P, and this pointer P indicates the speed directly on the dial.

Owing to the revolution of the wheel, the fixed projection above mentioned turns the arms L in succession and so, also, the arms K, which arms K rotate the wheel C and pinion F, which in turn rotate the wheel B, spindle M, and pointer P, and the spring S is compressed. When the projection has passed the successive arms L, the spring S uncoils somewhat and moves the wheel B and the pointer P backward, but is retarded by the escapement G. When the spring S has been compressed to a certain degree, the indicator is moved back by the spring just as far as it is moved forward at each revolution of the wheel by the action of the said projection on the said arms, and the pointer remains practically stationary until the speed of revolution of the wheel is altered. Then the indicator either moves forward or backward until the compression of the spring S is such as to counterbalance the tendency to move forward under the action of the said projection.

In the case of the application of the invention to a wheel or any rotating part of a stationary engine or the like the indicator shows directly on the dial the number of revolutions per minute or other time unit of the rotating part. If the pointer indicates, say, the figure "10" on the dial, the device is recording the fact that the wheel is revolving at the rate of ten revolutions to the second, minute, or other time unit selected. In the case of a vehicle or other traveling object the device indicates directly on the dial at what rate the vehicle is moving. In this case if the pointer indicates, say, the figure "10," then the vehicle would be moving at ten miles per hour.

In the modification shown in Figs. 3 and 4 in place of the arms K and L (shown in Figs. 1 and 2) there is shown a single lever $l$, pivoted at $l'$ to the casing A. The said lever $l$ is moved in one direction by the action of a stud or other projection on the wheel the speed of rotation of which is being measured, and the said lever returns to its original position under the action of a spring $l^2$. The said lever $l$ is mounted external to the casing; but on the same pivot $l'$ is secured within the casing A a parallel lever $k$, at the free end of which is pivoted a pawl $k'$, kept in engagement with the ratchet-wheel $c$ by means of a spring $k^2$. A pin $k^3$ is fitted on the casing A, so as to move the said pawl $k'$ out of engagement with the ratchet-wheel, and thus allow the said ratchet-wheel to move backward. The gearing and escapement mechanism may be the same as in the previous modification; but the coil-spring $s$ is contained within a small disk-like box $s'$ on the top of the casing, as shown in Fig. 4.

It is to be understood that my invention is not limited to the details of construction shown and described, as these may be varied without departing from the spirit of the invention.

What I claim as my invention, and desire to secure by Letters Patent, is—

1. The herein-described speed-indicator comprising, in combination, a casing, a spindle, a rotary measuring device carried by said spindle, a second spindle, gear-wheels carried by said spindles, means adapted to be actuated by a moving part external to the indicator and operating through said gear-wheels to rotate said measuring device, resilient means tending to move said measuring device in the opposite direction, and means adapted to retard the movement of said measuring device under the action of said resilient moving means, as and for the purpose set forth.

2. The herein-described speed-indicator comprising, in combination, a casing, a spindle, a pointer carried by said spindle, a second spindle, gear-wheels carried by said spindles, devices pivoted to the casing and adapted to be actuated by a moving part external to the indicator and operating through said gear-wheels to rotate said pointer, a spring tending to move said pointer in the opposite direction and means adapted to retard the movement of said pointer under the action of said spring, as and for the purpose set forth.

3. The improved speed-indicator, comprising, in combination, a casing, a central spindle, a cog-wheel on said spindle, a second spindle, a cog-wheel on said spindle in gear with said first-mentioned wheel, a toothed wheel and a ratchet-wheel fixed to said second spindle, a toothed wheel loosely mounted on said second spindle, an escapement device acting on said loose wheel, a pawl on said loose wheel adapted to engage said ratchet-wheel, means adapted to be actuated by a rotating part external to the indicator to rotate said fixed toothed wheel, an index-pointer mounted on said central spindle, and a spring tending to move back said central spindle against the forward feeding motion imparted from said toothed wheel, as and for the purpose set forth.

4. The improved speed-indicator, comprising, in combination, the casing A, central spindle M, cog-wheel B fixed to said spindle M, spindle O, pinion F, ratchet-wheel E and toothed wheel $c$ fixed to said spindle O, toothed wheel D loose on said spindle O, pawl H secured to the wheel D and engaging the ratchet-teeth of wheel E, escapement G, levers $l$, $k$, spring $l^2$, pawl $k'$, spring $k^2$, pin $k^3$, spring $s$, and pointer P, as shown and described.

In testimony whereof I have signed my name to this specification in the presence of two subscribing witnesses.

CHARLES GEORGE BRINSMEAD HOLMAN.

Witnesses:
WALLACE CRANSTON FAIRWEATHER,
JAMES WRIGHT.